Aug. 2, 1960 E. S. SELMER 2,947,479

ELECTRONIC ADDER

Filed Sept. 25, 1953 8 Sheets-Sheet 1

INVENTOR.
ERNST S. SELMER
BY James B. Christie
ATTORNEY

INVENTOR.
ERNST S. SELMER
BY James B. Christie
ATTORNEY

Aug. 2, 1960 E. S. SELMER 2,947,479

ELECTRONIC ADDER

Filed Sept. 25, 1953 8 Sheets-Sheet 3

*$C'_{16}$ (CARRY BEYOND 15) SENSED AT C-1

INVENTOR.
ERNST S. SELMER

BY

ATTORNEY

Aug. 2, 1960 E. S. SELMER 2,947,479

ELECTRONIC ADDER

Filed Sept. 25, 1953 8 Sheets-Sheet 4

INVENTOR.
ERNST S. SELMER

BY James B. Christie

ATTORNEY

Aug. 2, 1960

E. S. SELMER

ELECTRONIC ADDER 2,947,479

Filed Sept. 25, 1953

8 Sheets-Sheet 5

INVENTOR.
ERNST S. SELMER

BY James B. Christie

ATTORNEY

INVENTOR.
ERNST S. SELMER
BY James B. Christie
ATTORNEY

INVENTOR.
ERNST S. SELMER
BY James B. Christie
ATTORNEY

ALL TOGGLES EXCEPT C-2, C-4, C-8 AND C-16

TOGGLES C-2, C-4, C-8 AND C-16

INVENTOR.
ERNST S. SELMER
BY James B. Christie
ATTORNEY

United States Patent Office 2,947,479

Patented Aug. 2, 1960

2,947,479

ELECTRONIC ADDER

Ernst S. Selmer, Oslo, Norway, assignor, by mesne assignments, to Burroughs Corporation, Detroit, Mich., a corporation of Michigan Filed Sept. 25, 1953, Ser. No. 382,401

13 Claims. (Cl. 235—169)

This invention relates to digital computers and it is primarily concerned with improvements in electronic apparatus for adding numbers at a high speed.

The fundamental operation in most digital computers is the addition of two numerals. Besides providing the sum of numbers to be added; the addition function of the computer is employed in effecting subtraction, multiplication, division, logical operations, etc., which may be combined to perform mathematical computations.

I have developed an electronic adder which is capable of operating at high speeds with great reliability, yet the circuitry is relatively simple and it employs conventional electronic components.

In accordance with my invention, I provide two sets of four bi-stable multivibrators which act as electronic toggles for providing binary registrations of the successive numerals of the two addends, an additional multivibrator or electronic toggle for providing a binary registration of any carry digit, and pulse-responsive gate means interconnecting one of the sets of toggles and the other toggles for altering the binary condition of the other set of four toggles and the carry toggle to represent the sum of the successive numerals of the addends which are registered in the two sets of toggles.

Ordinarily the set of four toggles whose binary condition is altered to represent the sums of the successive numerals of the addends is coupled to a register, so that the successive summations are shifted into the register when the next two numerals to be added are shifted into the two sets of toggles.

In order to register decimal numbers in a set of four toggles, the toggles are ordinarily designated by the numbers 1, 2, 4 and 8, so that the summation of the numbers which the actuated toggles represent equals the decimal number registered. The following table indicates such a binary code:

TABLE I

| Decimal Number | Binary Code | | | |
|---|---|---|---|---|
| | Toggle | | | |
| | 8 | 4 | 2 | 1 |
| 0 | 0 | 0 | 0 | 0 |
| 1 | 0 | 0 | 0 | 1 |
| 2 | 0 | 0 | 1 | 0 |
| 3 | 0 | 0 | 1 | 1 |
| 4 | 0 | 1 | 0 | 0 |
| 5 | 0 | 1 | 0 | 1 |
| 6 | 0 | 1 | 1 | 0 |
| 7 | 0 | 1 | 1 | 1 |
| 8 | 1 | 0 | 0 | 0 |
| 9 | 1 | 0 | 0 | 1 |

Four toggles may be employed to register sixteen numerals in binary form since sixteen different binary conditions may be provided. In the adder, the four toggles whose binary condition is altered to represent the sums of the successive numerals are employed to provide a binary answer for the sums from 0 to 15, and these four toggles and the carry toggle are employed to provide a binary answer for the sums from 16 to 19. Then a decimal correction is effected to alter the binary condition of the five toggles for sums from 10 to 19 so that the tens digit is registered in the carry toggle and the units digit is registered in the other four adder toggles in accordance with the code of Table I. The following table indicates these binary and decimal answers:

TABLE II

| Binary Answer | | | | | Decimal No. | Decimal Answer | | | | |
|---|---|---|---|---|---|---|---|---|---|---|
| $C_1$ | $X_8$ | $X_4$ | $X_2$ | $X_1$ | | $C_1$ | $X_8$ | $X_4$ | $X_2$ | $X_1$ |
| 0 | 0 | 0 | 0 | 0 | 0 | 0 | 0 | 0 | 0 | 0 |
| 0 | 0 | 0 | 0 | 1 | 1 | 0 | 0 | 0 | 0 | 1 |
| | | | | | | Decimal Answer After Decimal Correction | | | | |
| 0 | 0 | 0 | 1 | 0 | 2 | 0 | 0 | 0 | 1 | 0 |
| 0 | 0 | 0 | 1 | 1 | 3 | 0 | 0 | 0 | 1 | 1 |
| 0 | 0 | 1 | 0 | 0 | 4 | 0 | 0 | 1 | 0 | 0 |
| 0 | 0 | 1 | 0 | 1 | 5 | 0 | 0 | 1 | 0 | 1 |
| 0 | 0 | 1 | 1 | 0 | 6 | 0 | 0 | 1 | 1 | 0 |
| 0 | 0 | 1 | 1 | 1 | 7 | 0 | 0 | 1 | 1 | 1 |
| 0 | 1 | 0 | 0 | 0 | 8 | 0 | 1 | 0 | 0 | 0 |
| 0 | 1 | 0 | 0 | 1 | 9 | 0 | 1 | 0 | 0 | 1 |
| 0 | 1 | 0 | 1 | 0 | 10 | 1 | 0 | 0 | 0 | 0 |
| 0 | 1 | 0 | 1 | 1 | 11 | 1 | 0 | 0 | 0 | 1 |
| 0 | 1 | 1 | 0 | 0 | 12 | 1 | 0 | 0 | 1 | 0 |
| 0 | 1 | 1 | 0 | 1 | 13 | 1 | 0 | 0 | 1 | 1 |
| 0 | 1 | 1 | 1 | 0 | 14 | 1 | 0 | 1 | 0 | 0 |
| 0 | 1 | 1 | 1 | 1 | 15 | 1 | 0 | 1 | 0 | 1 |
| 1 | 0 | 0 | 0 | 0 | 16 | 1 | 0 | 1 | 1 | 0 |
| 1 | 0 | 0 | 0 | 1 | 17 | 1 | 0 | 1 | 1 | 1 |
| 1 | 0 | 0 | 1 | 0 | 18 | 1 | 1 | 0 | 0 | 0 |
| 1 | 0 | 0 | 1 | 1 | 19 | 1 | 1 | 0 | 0 | 1 |

The binary answers representing the decimal numbers from 10 through 15 are designated "forbidden combinations" because the binary condition of the four toggles $X_1$, $X_2$, $X_4$ and $X_8$ representing these numbers is in non-decimal form. The binary answers representing the decimal numbers from 16 through 19 have the tens digit registered in the carry toggle $C_1$, but the binary condition of the toggles $X_1$, $X_2$, $X_4$ and $X_8$ must be altered in order to provide the answer in decimal form.

A binary answer is registered in the toggles in response to static potentials which set up gates which allow an "add" pulse to actuate selected toggles. The static potentials are set up in accordance with the toggles which are initially actuated in order to represent the numerals to be added.

A binary answer is converted to a decimal answer by static potentials which allow a "decimal correct" pulse to actuate selected toggles. The potentials are set up by toggles which register forbidden combinations or carries beyond 15 in the binary answers.

Thus, a binary answer causes the toggles in the adder to set up gates which permit a decimal correct pulse to alter the condition of the toggles to provide a decimal answer.

If it is necessary to complement either or both of the sets of four toggles, say in effecting subtraction, a complement pulse, which precedes the add pulse, is applied to gates which effect this function.

The feature of employing an add and a decimal correct pulse to effect addition and provide an answer in decimal form permits the use of relatively simple circuitry in the adder, and the reliability of operation of the adder is enhanced. The decimal correct pulse may be delayed only three microseconds after the add pulse; hence the additional time required to effect decimal correction is slight.

The invention is explained with reference to the drawings, in which.

Figures 1, 2, 5:
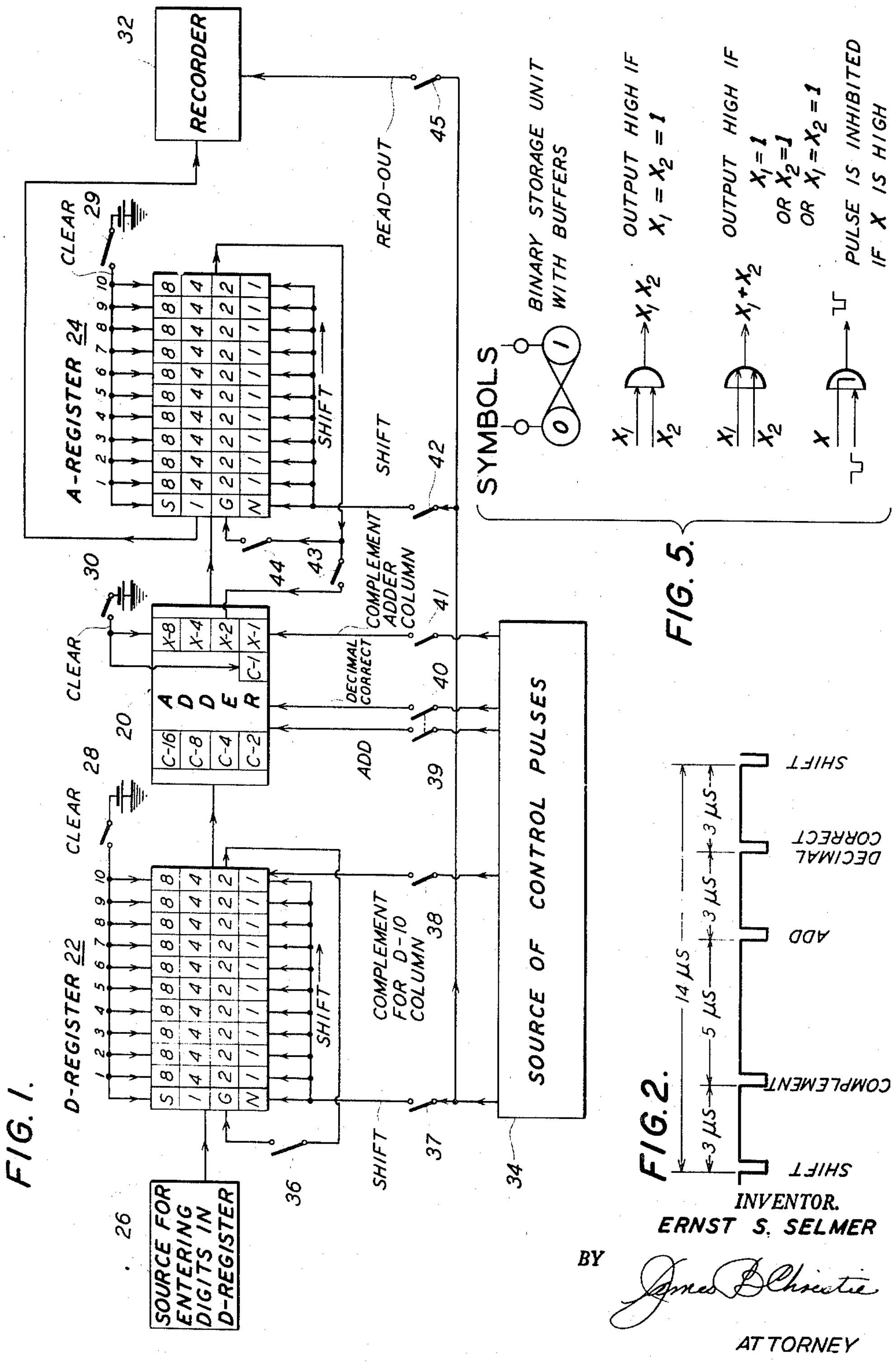
Fig. 1 is a block diagram showing how the adder may be employed in conjunction with registers to effect addition of multi-digit numbers.
Fig. 2 is a diagram showing the time-sequence of the pulses which are applied to the adder and the associated register.
Fig. 5 is an explanation of the symbols which are employed in Figs. 3 and 4.

In the apparatus of Fig. 1, the adder 20 is connected to receive static digital information from a D-register 22 and to supply digital information to and receive digital information from an A-register 24. The registers 22 and 24 are each provided with a plurality of sets of four toggles, and each set of four toggles is arranged to register a decimal digit in accordance with the 1, 2, 4, 8 binary code shown in Table I. In the apparatus illustrated, each register is provided with eleven sets of four toggles, with the first set of four toggles designated the "SIGN" column and the other sets of four toggles being designated columns 1 to 10. Thus, a ten digit decimal number and a plus or a minus sign may be registered in each of the registers 22 and 24.

Digital information is supplied to the register 22 from a source 26 which may be any conventional type adapted to actuate a set of four toggles in accordance with the binary code of Table I. The sign is registered in the "SIGN" column by causing the "1" toggle to be actuated or in the one state for minus and by causing all four of the toggles to be in the zero state for plus.

The registers 22 and 24 and the adder 20 may be cleared of all digital information by operating the switches 28, 29 and 30.

A recorder 32 is coupled to the "SIGN" column of the register 24 for providing a record of the digital information which is stored in the register 24. The recorder may be a conventional type adapted to provide a record of digital information which is registered in a set of four toggles.

The read-out arrangement of Fig. 1 is suitable for use with a recorder which must record the sign first and then the most significant digit, etc. This is the usual recording sequence when an electric typewriter is employed as the recorder.

It will be apparent that some recording arrangements, say magnetic storage recorders, may be coupled to the tenth column of the register 24. With such an arrangement the least significant digit of the answer is recorded first.

Pulses for actuating the apparatus of Fig. 1 are provided by a source 34. The source 34 may be any type suitable for repeatedly providing a series of pulses spaced as indicated in Fig. 2. Ordinarily these pulses are derived from a synchronizing source and suitable pulse generator circuits, in accordance with conventional high speed computer techniques. The pulse spacing illustrated in Fig. 2 is the preferred spacing for attaining reliable high speed operation; however, other spacings may be employed if desired.

With the pulse spacing of Fig. 2, addition of two numerals is effected in 14 microseconds. If complementing must follow the addition, 28 microseconds is required.

Control switches 36 to 45 serve to connect the source 34 of control pulses to the various components of the apparatus of Fig. 1 and to connect the outputs of the registers 22 and 24 as required.

Mechanical switches are shown in Fig. 1 in order to simplify the disclosure. Ordinarily, the control switches 28 to 30 and 36 to 45 are high speed electronic types which are controlled by electric commands.

A set of four adder toggles $X_1$, $X_2$, $X_4$ and $X_8$ in the adder 20 registers the numerals which are transferred to it from the tenth column of the register 24, an additional toggle $C_1$ registers any carry digits, and a further set of four toggles $C_2$, $C_4$, $C_8$ and $C_{16}$ serves as an auxiliary carry storage unit.

The binary condition of the adder toggles $X_1$, $X_2$, $X_4$ and $X_8$ is altered in accordance with the information in the tenth column of the register 22 in order to effect addition. Thus, a numeral may be shifted into the adder toggles $X_1$, $X_2$, $X_4$ and $X_8$ from the tenth column of the register 24, and the binary condition of the adder toggles and the carry toggle $C_1$ is then altered in accordance with the information in the tenth column of the register 22 so that the condition of the adder toggles and the carry toggle $C_1$ represents the binary sum of the two numerals. The initial summation provides a binary answer which is immediately converted to a decimal answer by decimal correct pulse, in accordance with the chart of Table II. The successive decimal digits of the answer are shifted into the register 24.

In operation, the switches 36 and 37 are closed and one of the addends is shifted into the register 22 by causing the successive numerals to be shifted to the right until the digits of the addend are registered in the columns 1 to 10 and the sign of the addend is registered in the "SIGN" column of the register 22. The switch 36 is then opened. This addend is transferred to the register 24 by closing the switches 37, 39, 40, 42 and 43 so that the successive numerals in the register 22 are shifted to the right and the zeros in the register 24 are shifted into the adder toggles $X_1$, $X_2$, $X_4$ and $X_8$. The successive numerals in the register 22 are thereby added to the zeros in the register 24 to cause the numerals to be transferred to the register 24. The switches 39, 40, 42 are then opened, the switches 36 and 37 are closed, and the numerals of the other addend are shifted into the register 22.

The two addends are added by closing the switches 37, 39, 40, 42 and 43, and the answer is shifted into the register 24. The various switches are then opened so that the answer remains in the register 24. In order to provide a record of the answer, the successive numerals are recirculated in the register 24 by closing the switches 42 and 44, and the read-out switch 45 is closed to actuate the recorder 32. The individual numerals which are transferred from the tenth column to the "SIGN" column of the register 24 during recirculation are sensed and recorded by the recorder 32. When printing-out the answer, the recorder 32 ordinarily operates slower than the speed at which numerals can be recirculated in the register 24. In this case the shift switch 42 is closed until ten shift pulses cause the numeral in the first column to be recirculated to the "SIGN" column of the register 24, the shift switch 42 is then opened and the numeral being read-out is retained in the "SIGN" column until the recorder 32 completes the recording of the numeral. Then the shift switch 42 is closed until ten shift pulses cause the next numeral to be recirculated to the "SIGN" column, the switch 42 is again opened so that the numeral is retained until recording is complete, and so on until all of the numerals in the register 24 are recorded.

If subtraction is to be performed, the nines complement of the number to be subtracted is added to the other number to obtain the answer. Thus, the switch 38 or the switch 41 is closed to effect subtraction, depending upon which number is to be subtracted from the other. These switches may be actuated electronically by suitable commands, or they may be actuated electronically by apparatus under the control of the "SIGN" columns of the two registers.

Since the operation of the adder depends upon the binary addition of three variables for each binary digit of the binary coded decimal number, followed by a final decimal correction operation, a detailed explanation of the operation of the adder must begin with the logics of binary addition of three variables. The variables are arbitrarily called X, Y and C. X and Y are two binary digits each of which may be 1 or 0 only. C is the carry digit and may be 1 or 0, either before or after the addition, or both. Table III shows all possible combinations of X, Y and C, and when these three are added together the new answer is as shown in the columns "Final X" and "Final C."

TABLE III

| X | Y | C | Final X | Final C |
|---|---|---|---|---|
| 0 | 0 | 0 | 0 | 0 |
| 1 | 0 | 0 | 1 | 0 |
| *0 | 1 | 0 | 1 | 0 |
| *1 | 1 | 0* | 0 | 1 |
| *0 | 0 | 1 | 1 | 0 |
| *1 | 0 | 1* | 0 | 1 |
| 0 | 1 | 1* | 0 | 1 |
| 1 | 1 | 1* | 1 | 1 |

Observe that X is changed in those rows indicated by an asterisk at X, and that the final C equals "one" for those rows indicated by an asterisk at C. The adder operates by changing the state of the storage unit that contains X. Table III indicates that X is changed whenever the initial Y is different from the initial C; or it can also be stated that X is never changed when the initial binary digits Y and C are the same. This latter expression is used in the following logical equations for the adder which are written in accordance with Boolean algebra. The notation is such that a "·" indicates a logical multiplication, while a "+" indicates a logical addition.

Don't change X if the following equation is true or equal to 1:

$Y \cdot C + Y^1 \cdot C^1 = 1$ (Y¹ is the complement of Y)
(C¹ is the complement of C)

Checking the equation with the last row of Table III where $Y=1$ and $C=1$:

$1 \times 1 + 0 \times 0 = 1$ (If $Y=1$ $Y^1=0$
if $C=1$ $C^1=0$, etc.)

This equation is true so X must not be changed as confirmed by the table.

Checking the equation by row 3 where $Y=1$ and $C=0$:

$$1 \times 0 + 0 \times 1 \neq 1$$

This equation does not equal 1 so X must be changed as confirmed by the table.

The operation on the carry digit C in the adder is not "Change C" but rather "make C equal to 1." The final carry C must be made equal to one, according to the following equation:

$$X \cdot C + X \cdot Y + Y \cdot C = 1$$

This equation states that the final carry will be 1 if $X \cdot Y = 1$, or $X \cdot C = 1$ or $Y \cdot C = 1$, or if all three of X, Y and C are equal to 1. This conforms with Table III.

Table I gives the binary code for decimal numbers 0 to 9 inclusive. Four storage toggles which are designated 1, 2, 4 and 8 are used to represent each digit.

For addition of two decimal numbers plus possible carries the requirements are as follows:

(1) Four binary storage units for $X_1$, $X_2$, $X_4$ and $X_8$
(2) Four binary storage units for $Y_1$, $Y_2$, $Y_4$ and $Y_8$
(3) Four binary storage units for $C_1$, $C_2$, $C_4$ and $C_8$ Equations must be formed for each binary digit:

Don't change $X_1$ for $Y_1 \cdot C_1 + Y_1^1 \cdot C_1^1 = 1$
Don't change $X_2$ for $Y_2 \cdot C_2 + Y_2^1 \cdot C_2^1 = 1$
Don't change $X_4$ for $Y_4 \cdot C_4 + Y_4^1 \cdot C_4^1 = 1$
Don't change $X_8$ for $Y_8 \cdot C_8 + Y_8^1 \cdot C_8^1 = 1$ $C_1$ is the initial and final carry storage unit and is set to one or zero by the initial information fed to the adder. $C_2$ must be set by the results of adding or sensing $C_1$, $X_1$ and $Y_1$, and $C_4$ by sensing $C_2$, $X_2$ and $Y_2$, etc. Thus the other equations necessary are:

Provide a carry=1 for $C_2$ if $X_1 \cdot Y_1 + X_1 \cdot C_1 + Y_1 \cdot C_1 = 1$
Provide a carry=1 for $C_4$ if $X_2 \cdot Y_2 + X_2 \cdot C_2 + Y_2 \cdot C_2 = 1$
Provide a carry=1 for $C_8$ if $X_4 \cdot Y_4 + X_4 \cdot C_4 + Y_4 \cdot C_4 = 1$
Provide a carry=1 for $C_{16}$ if $X_8 \cdot Y_8 + X_8 \cdot C_8 + Y_8 \cdot C_8 = 1$ The carry formed by the last equation is actually used to modify the original carry storage unit $C_1$ but because of the methods used this information is held in $C_{16}$, an additional carry storage unit, until the addition is performed by an add pulse.

Information is shifted into the X column and the Y column prior to an addition so that one digit of one decimal number is in X, the adder column, and the corresponding digit of another decimal number is in Y, the last column of a storage register. The results of the equations listed above are formed statically by the adder gates and the addition pulse is applied to $X_1$, $X_2$, $X_4$, $X_8$, and $C_1$ to give a final binary answer.

For example, if one decimal digit $X=5$ and a second decimal digit $Y=4$ and the initial carry $C_1=0$ each storage unit is set as follows:

| | | |
|---|---|---|
| | | $C_{16}=0$ |
| $X_8=0$ | $Y_8=0$ | $C_8=0$ |
| $X_4=1$ | $Y_4=1$ | $C_4=0$ |
| $X_2=0$ | $Y_2=0$ | $C_2=0$ |
| $X_1=1$ | $Y_1=0$ | $C_1=0$ |

Following an addition pulse, the adder column X and $C_1$ have the following states:

| | |
|---|---|
| $X_8=1$ | |
| $X_4=0$ | |
| $X_2=0$ | |
| $X_1=1$ | $C_1=0$ |

This is the binary code for the decimal answer 9. In this case the binary sum is the required sum. Now consider the result when $X=8$ and $Y=7$ and $C_1=0$.

Initially the storage states are:

| | | |
|---|---|---|
| | | $C_{16}=0$ |
| $X_8=1$ | $Y_8=0$ | $C_8=0$ |
| $X_4=0$ | $Y_4=1$ | $C_4=0$ |
| $X_2=0$ | $Y_2=1$ | $C_2=0$ |
| $X_1=0$ | $Y_1=1$ | $C_1=0$ |

After the addition pulse the X column and $C_1$ are as follows:

| | |
|---|---|
| $X_8=1$ | |
| $X_4=1$ | |
| $X_2=1$ | |
| $X_1=1$ | $C_1=0$ |

This is the binary code for 15 which is a "forbidden combination" in the binary coded decimal system since no single decimal digit in one column should be greater than 9. Therefore a decimal correction pulse is applied which changes the 15 in the Adder column X, and $C_1=0$, to a 5 in the adder column and $C_1=1$. In the addition of two decimals numbers, X can be any decimal digit 0 to 9 inclusive, Y can also be any decimal digit from 0 to 9 inclusive, and the initial carry $C_1$ can be 0 or 1. If all three are 0, the sum is 0. If $X=9$ and $Y=9$ and $C=1$, the maximum possible decimal sum is 19. Table II lists all possible answers from 0 to 19 inclusive in binary form as they appear in the adder column and $C_1$ after an addition, and also what the adder column and $C_1$ must contain after decimal correction is applied.

The binary answers from 10 to 15 contain forbidden combinations—that is a binary code totaling greater than 9. These answers must be modified by the decimal correction circuit to conform with the corresponding code in the decimal answer column. Binary answers from 16 to 19 have $C_1=1$ in their binary form, and must also be corrected. Decimal correction for all binary answers greater than 9 is necessary and is performed by a decimal correct pulse which is gated by the occurrence of a forbidden combination (F) or a carry in the binary answer $C_{16}$. This carry occurs in $C_1$ storage but is called $C_{16}$ when used for decimal correct to indicate that it occurs for binary answers greater than 15.

The equation for F is formed as follows:

$$F=1 \text{ when } X_8(X_4+X_2)=1$$

The equation for carry beyond 15 is simply $C_{16}=1$. Decimal correct is therefore applied when either of these two equations are true or equal to 1. Decimal correct $D=1$ when $F+C_{16}=1$, or the inverse statement: No decimal correct $D^1=1$ when $F^1 \cdot C_{16}^1=1$. Since the gating voltage inhibits, the latter is the equation set up by the adder. $D^1=F^1 \cdot C_{16}^1$ and when $F^1 \cdot C_{16}^1=1$, no decimal correction is required. Since $F^1$ is used rather than $F_1$ the complement of the equation for F is formed:

$$F=X_8(X_4+X_2)$$
$$F^1=X_8^1+X_2^1 \cdot X_4^1$$

Comparison of the two answer columns in Table II indicates that the decimal correct pulse must change $X_1$, $X_2$, $X_4$, $X_8$ and $C_1$ as follows if the binary answer is over 9 and $D=F+C_{16}=1$:

(1) Never change $X_1$
(2) Always change $X_2$
(3) Change $X_4$ if $X_2=0$
(4) Change $X_8$ if $X_2=1$ or $X_4=1$ or $X_2=X_4=1$
(5) Set $C_1$ to 1 if $F=1$ The equations used by the adder for correction are thus:

Do not change $X_2$ for $D^1=1$
Do not change $X_4$ for $D^1+X_2=1$
Do not change $X_8$ for $D^1+X_2^1 \cdot X_4^1=1$
Do not set $C_1$ to 1 for $F^1=1$ The decimal correct pulse is gated by these equations and is applied after the initial addition pulse, and corrects the binary addition to the required decimal answer stored in the X (adder) column and the main carry storage $C_1$.

Figure 3:
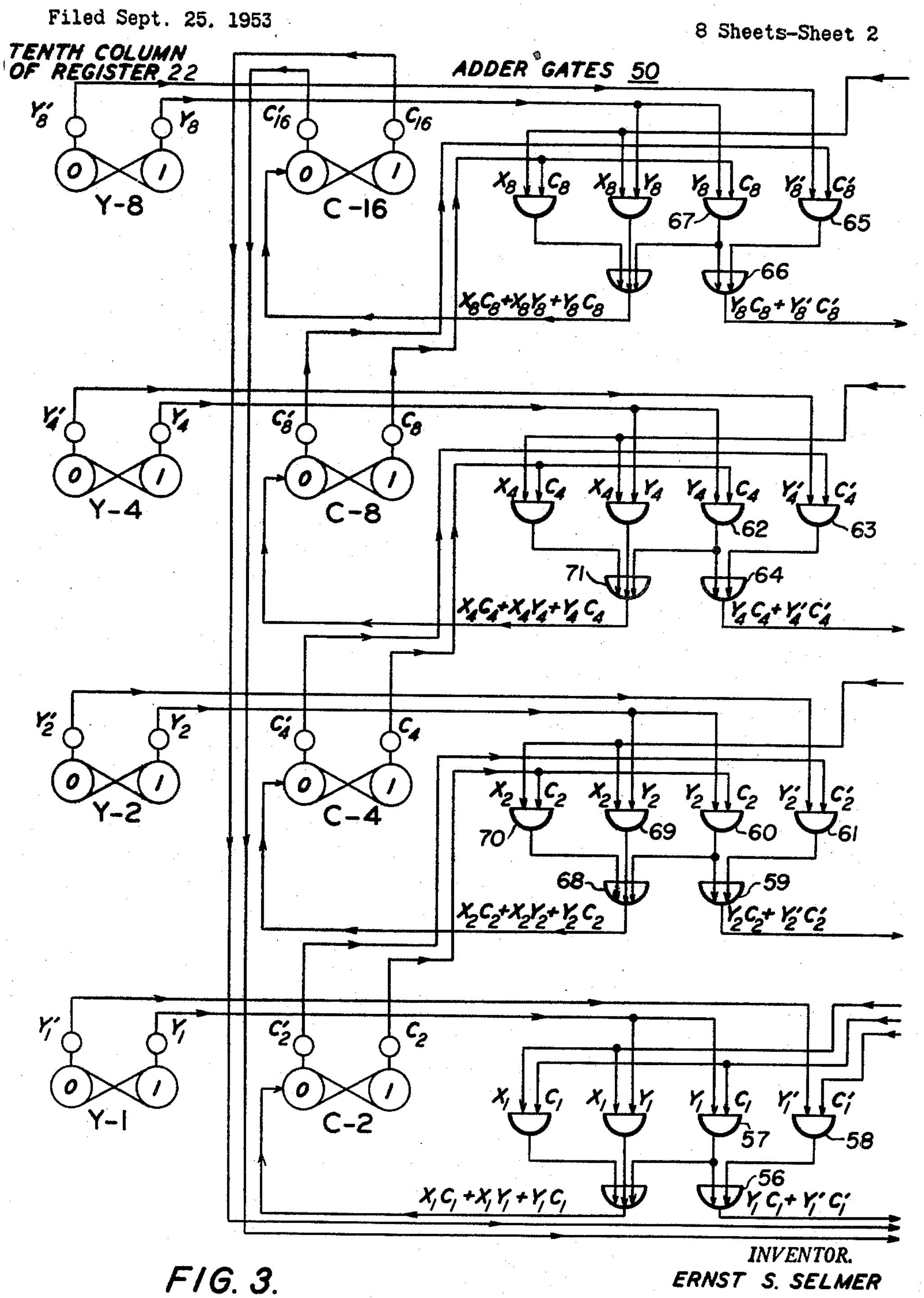
Figs. 3 and 4 show the logics of the adder.
Figure 4:
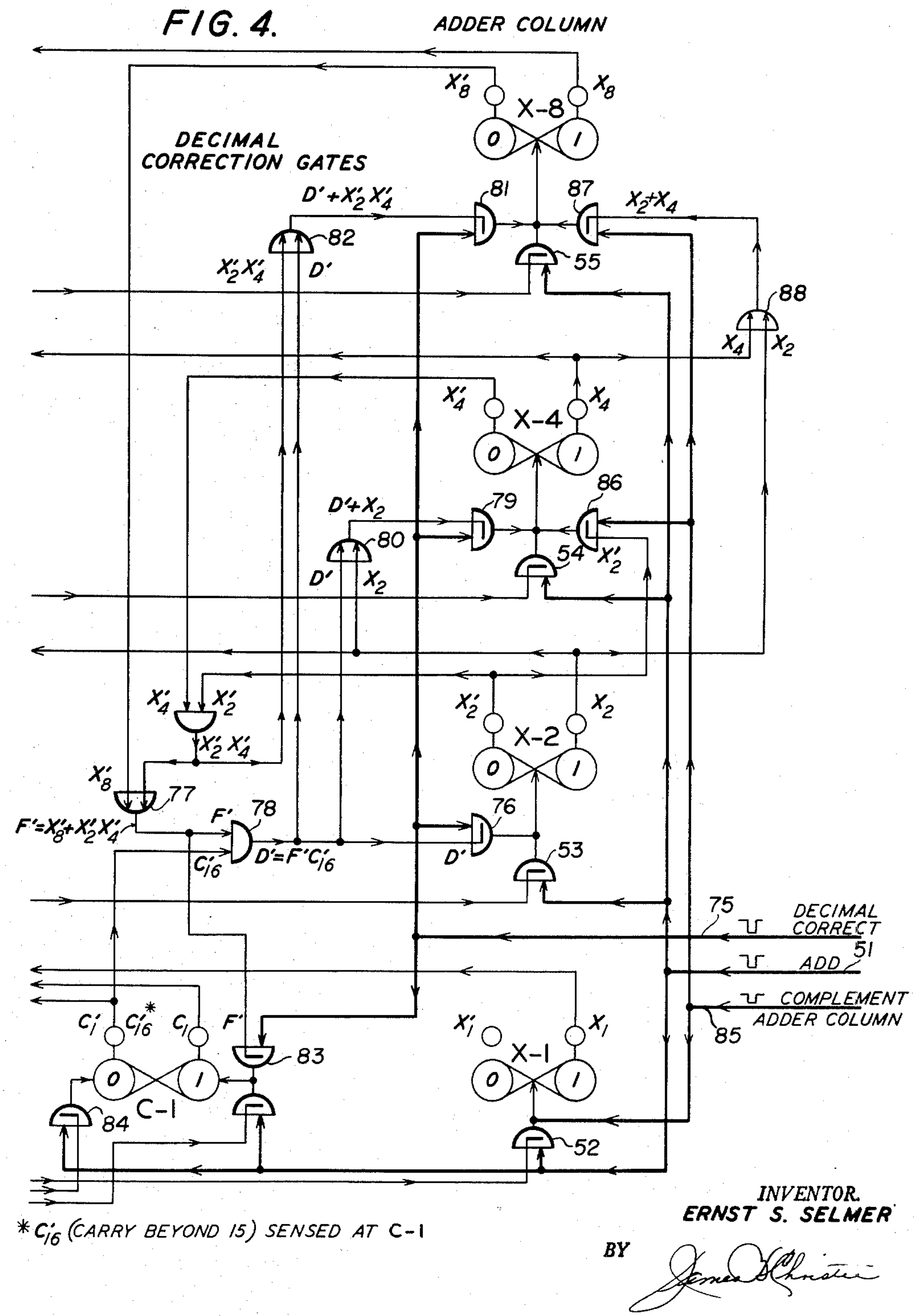

Apparatus for performing the functions of the above given equation is shown in Figs. 3 and 4. As is well known, the function of logical multiplication indicated by the symbol "·" may be accomplished in what is known as a logical "and" circuit. Likewise, a logical addition, as indicated above by the symbol "+," may be accomplished by what is known as a logical "or" circuit. Complementary functions, e.g., $Y_1'$ and $Y_1$, may be provided by the condition of stability of a conventional bistable circuit. For convenience, an explanation of the customary logical symbols is given in Fig. 5. In the examples given below, a "low" signal indicates one binary condition, i.e., "0," while a "high" signal indicates another binary condition, i.e., "1." In Figs. 3 and 4 a binary coded decimal digit is first transferred or shifted into the adder column storage units X–1, X–2, X–4 and X–8. These units provide the outputs $X_1$, $X_1^1$, $X_2$, $X_2^1$, $X_4$, $X_4^1$, $X_8$ and $X_8^1$. Another binary coded decimal digit is stored in the tenth column of the register 22, which contains the four binary storage units Y–1, Y–2, Y–4 and Y–8. These units supply outputs $Y_1$, $Y_1^1$, $Y_2$, $Y_2^1$, $Y_4$, $Y_4^1$, $Y_8$ and $Y_8^1$. The main carry storage unit C–1 and the auxiliary storage units C–2, C–4, C–8 and C–16 provide outputs as shown. The four sets of adder gates 50 form the eight equations required for addition, and they control the states of the auxiliary carry storage units C–2, C–4, C–8 and C–16. The adder gates also control the operation of the addition pulse applied to the units X–1, X–2, X–4, X–8 and C–1. The decimal correction gates are likewise indicated with equations formed by each gate.

The operation of the apparatus of Figs. 3 and 4, and the corresponding electronic circuitry shown in Figs. 6 through 9, will be illustrated by considering the manner in which the apparatus functions to perform the addition of actual numbers. Accordingly, there will be given below an example of the addition of two binary coded decimal digits in which the sum is less than ten, thereby not requiring a carry operation; the addition of two binary coded decimal digits whose sum is greater than ten, thereby requiring a carry operation; and the addition of a carry from a previous addition and two binary coded decimal digits.

*Addition of four and three*

Assuming that the binary coded decimal digit 4 appears in the adder column, the X–4 bi-stable circuit will be in its "1" condition of operation while the X–1, the X–2 and the X–8 bi-stable circuits will be in their "0" condition of operation. Assuming that the registration in the 10th column of register 22 is the binary coded decimal digit 3, the Y–2 bi-stable circuit, and the Y–1 bi-stable circuit will be in their "1" condition of operation, while the Y–4 and Y–8 circuits will be in their "0" condition of operation.

In order to accomplish the addition, an add pulse is applied to the input lead 51 from the source 34 of Fig. 1. The add pulse is gated selectively to the X–1, X–2, X–4 and X–8 bi-stable circuits via the gates 52, 53, 54 and 55. As noted above, the adder gates 50 provide signals in accordance with the equations for accomplishing an addition depending upon the conditions of operation of the binary storage units, i.e. bi-stable circuits. Thus, considering the X–1 bi-stable circuit, which at the beginning of the add operation is in its "0" condition of operation, the add pulse will be applied to the X–1 circuit to cause it to assume its "1" condition of operation if the input signal applied to the gate 52 is low.

This condition obtains in accordance with the equations above if $Y_1 \cdot C_1+Y_1^1 \cdot C_1^1$. Thus, the gate 52 is controlled by the "or" circuit 56 to which is applied the output of the "and" circuits 57 and 58. Assuming that there is no carry from a previous operation, the bi-stable circuit C–1 is in its "0" condition of operation. This means that the signal $C_1$ is low, while the signal $C_1^1$ is high.

Since the Y–1 circuit is in its "1" condition of operation, the $Y_1$ output is high, while the $Y_1^1$ output is low. Thus, the signals applied to the "and" circuit 57 are $Y_1$ which is high, and $C_1$ which is low. The result is that the output from the "and" circuit 57 is low. Since neither one of the inputs to the "or" circuit 56 is high, the output of the "or" circuit will be low. Consequently, the signal applied to the gate 52 is low, and the add pulse is passed to the X–1 circuit, thereby changing its condition of operation to "1."

In like manner, the add pulse is applied to the X–2 circuit if the gate 53 is open, due to a relatively low signal being applied thereto from the "or" circuit 59 and the "and" circuits 60 and 61. Since there is no carry from the addition of X–1 to Y–1, and since Y–2 is in its "1" condition of operation, X–2 will be changed to its "1" condition of operation in a manner substantially similar to that described with respect to the addition of X–1 to Y–1.

Referring to the addition between X–4 and Y–4, it will be noted that the condition of circuit C–4 and the condition of Y–4 are alike, that is, both circuits are in their "0" condition of operation. Consequently, the signals applied to the "and" circuit 62 and the "and" circuit 63 are alike, that is, both $Y_4$ and $C_4$ are low, while both $Y_4^1$ and $C_4^1$ are high. Thus, both of the inputs to the "and" circuit 63 are high, thereby making its output signal high, which is passed by the "or" circuit 64 to close the gate 54 so that no add pulse is applied to the X–4 circuit.

Although it has taken some time to describe the operation of adding two binary coded decimal digits, it will be appreciated that the operation itself occurs practically instantaneously. It should be noted that the X–8 circuit remains in its "0" condition of operation because both C–8 and Y–8 are in their "0" conditions of operation, thereby providing a high output signal from the "and" circuit 65 and a high output from the "or" circuit 66, thereby maintaining the gate 55 closed. Therefore, at the conclusion of the addition operation of the binary coded digit 3 registered in the 10th column of register 22, and the binary coded digit 4 registered in the adder column, the condition of the bi-stable circuits of the adder column is as follows:

X–8 is in its "0" condition
X–4 is in its "1" condition
X–2 is in its "1" condition
X–1 is in its "1" condition Thus, the binary coded decimal digit 7 is registered in the adder column which is the sum of 4 and 3.

*Addition of six and seven*

Assuming that the binary coded decimal digits 6 and 7 are to be added together, thereby providing a sum greater than 10 and requiring a carry operation, the condition of operation of the bi-stable circuits of the 10th column of the register 22 in which there is registered the number 6, and the adder column in which there is registered the number 7, is as follows:

| | |
|---|---|
| Y–8 is in its "0" condition | X–8 is in its "0" condition |
| Y–4 is in its "1" condition | X–4 is in its "1" condition |
| Y–2 is in its "1" condition | X–2 is in its "1" condition |
| Y–1 is in its "0" condition | X–1 is in its "1" condition |

With respect to the addition between the circuits X–1 and Y–1, the add pulse will be prohibited from passing to the X–1 circuit since the C–1 circuit and the Y–1 circuit are in the same condition of operation, namely, both are in the "0" condition of operation. Thus, the input signals to the "and" circuit 58, $C_1^1$ and $Y_1^1$ are both high, thereby providing a high output signal which is passed by the "or" circuit 56 to inhibit the passage of any pulses through the gate 52. Thus, the X–1 circuit remains in its "1" condition of operation.

With respect to the X–2 circuit and the Y–2 circuit, the condition of operation of the Y–2 circuit and the C–2 circuits are unlike. That is, Y–2 is in its "1" condition of operation, while C–2 is in its "0" condition of operation. Therefore, the signals applied to the "and" circuits 60 and 61 are unlike, thereby providing an output signal from the "or" circuit 59 which is low, which opens the gate 53 to allow the add pulse to cause the circuit X–2 to assume its "0" condition.

In addition, the C–4 circuit assumes its "1" condition of operation in response to a high signal from the "or" circuit 68 which is derived from the "and" circuit 69. In essence, the "and" circuits 69, 69 and 70 sense that condition of operation when any two of the bi-stable circuits X–2, Y–2 and C–2 are in their "1" condition of operation. Since both the Y–2 circuit and the X–2 circuit were in their "1" condition prior to the addition, a high output signal is provided by the "and" circuit 69, which in turn is passed by the "or" circuit 68 to cause the bi-stable circuit C–4 to assume its "1" condition of operation.

It should be noted that the carry digit registering circuits C–2, C–4, C–8 and C–16 are adapted to respond to a single input signal. That is, when the input signal is high, the carry registering circuit assumes its "1" condition of operation, and when the input signal is low, the carry registering circuit assumes its "0" condition of operation.

Referring to the addition between the circuits X–4, Y–4 and C–4, the add pulse will be prohibited from passing to the X–4 circuit because the gate 54 will be closed. That is, since the circuits C–4 and Y–4 are in like conditions of operation, both input signals to the "and" circuit 62 will be high, thereby providing a high output signal from the "or" circuit 64, which will in turn maintain the gate 54 closed. In addition, the C–8 circuit will be set to "1," since the C–4 circuit and the Y–4 circuit are in a like condition of operation, thereby providing a high output signal from the "and" circuit 62 which is passed by the "or" circuit 71.

As to the Y–8 and C–8 addition, the add pulse will be passed to the X–8 circuit, causing it to assume its "1" condition of operation. That is, since the conditions of operation of C–8 and Y–8 are unlike, a low output signal will be provided by the "and" circuits 65 and 67, thereby resulting in a low output signal from the "or" circuit 66, which in turn holds the gate 55 open, thereby allowing the add pulse to be passed to the X–8 circuit.

At this time the registration in the adder column will be as follows:

X–8 is in its "1" condition
X–4 is in its "1" condition
X–2 is in its "0" condition
X–1 is in its "1" condition Thus, the binary sum registered in the adder column is 13. However, this is a sum in excess of ten. Accordingly, it is necessary to decimal correct the registration so that a carry is provided for the next subsequent addition, with the amount in excess of ten remaining in the adder column. This is accomplished by applying a decimal correct pulse to the lead 75.

With respect to the X–2 circuit, the decimal correct pulse will be passed by the gate 76. The gate 76 is held open by virtue of the fact that the X–8 circuit is in its "1" condition of operation, thereby providing the signal $X_8^1$ which is low, to the "or" circuit 77, which in turn applies a low output signal to the "and" circuit 78, thereby resulting in the output signal from the "and" circuit 78 being low, which holds the gate 76 open. Thus, the X–2 circuit is placed in its "1" condition of operation in response to the decimal correct pulse.

Before the decimal correct pulse operation, the X–4 circuit is in its "1" condition of operation. However, in response to the decimal correct pulse being passed by the gate 79, the X–4 circuit will be placed in its "0" condition of operation. The gate 79 is held open in response to the output signal from the "and" circuit 78 being low, which is passed via the "or" circuit 80.

As noted above, before the decimal correction operation, the X–8 circuit is in its "1" condition of operation. The decimal correct pulse is applied to the X–8 circuit to place it in its "0" condition of operation. The gate 81 receives a low output signal via the "or" circuit 82 from the "and" circuit 78.

In addition, the decimal correct pulse is applied to the C–1 circuit to place it in its "1" condition of operation. The gate 83 is held open by a low signal appearing at the output of the "or" circuit 77.

Thus, at the conclusion of the decimal correct operation, the adder column and the C–1 circuit are in the following condition:

X–8 is in its "0" condition
X–4 is in its "0" condition
X–2 is in its "1" condition
X–1 is in its "1" condition
C–1 is in its "1" condition Thus, a carry is indicated by the condition of the C–1 circuit, while the amount of the sum in excess of ten, i.e. 3, is registered in the adder column.

*Addition of a carry, eight and four*

Assuming that an addition is to be made between the two decimal digits, 8 and 4, whose sum is greater than 10 and that there is a carry from a previous addition operation, the condition of the circuits before the add pulse appears is as follows:

Y–8 is in its "1" condition X–8 is in its "0" condition
Y–4 is in its "0" condition X–4 is in its "1" condition
Y–2 is in its "0" condition X–2 is in its "0" condition
Y–1 is in its "0" condition X–1 is in its "0" condition
C–1 is in its "1" condition When the add pulse is applied to the lead 51, the gate 52 associated with the X–1 circuit will be open because the signals applied to each of the "and" circuits 57 and 58 are unlike by virtue of the fact that the conditions of the C–1 and Y–1 circuits are unlike. Therefore, no high signal will be applied to the "or" circuit 56, and as a result, a low signal will hold the gate 52 open. Thus, the carry will be propagated to the X–1 circuit which will be set to "1."

The gate 53 associated with the X–2 circuit will be held closed because the C–2, Y–2 and X–2 circuits are all in their "0" conditions of operation.

The X–4 circuit will remain in its "1" condition of operation because the Y–4 and the C–4 are both in their "0" conditions of operation, thereby supplying like high input signals to the "and" circuit 63 which will be passed by the "or" circuit 64 to the gate 54 to hold it closed.

With respect to the X–8 circuit, the gate 55 associated therewith will be held open because the Y–8 circuit is set to "1" and the C–8 circuit is set to "0." Thus, the X–8 circuit will be set of "1."

In addition, the C–1 circuit will be set to "0" because the gate 84 will be open by virtue of a low signal being applied thereto from the "1" side of the C–16 circuit which is in its "0" condition of operation. Thus, at the conclusion of the addition operation the condition of the adder column and the C–1 circuit is as follows:

X–8 is in its "1" condition
X–4 is in its "1" condition
X–2 is in its "0" condition
X–1 is in its "1" condition
C–1 is in its "0" condition Thus, the binary sum of registration in the adder column is thirteen.

However, it is necessary to decimal correct to provide a carry to a subsequent addition operation with the remaining 3 being registered in the adder column. This may be accomplished as described above in accordance with the previous example where a binary registration of thirteen was decimal corrected to provide a binary coded decimal registration.

Apart from the addition and decimal correction circuits, there is shown in Figs. 3 and 4 a circuit for complementing the registration appearing in the adder column. This is frequently desirable where a subtraction is to be performed. By applying a complementary pulse to the lead 85, the registration in the X–1 circuit will be reversed; the registration in the X–4 circuit will be reversed if the X–2 circuit is in its "1" condition, thereby applying a low signal to the gate 86; and the condition of the X–8 circuit will be reversed if either the X–2 or the X–4 circuits is in its "0" condition, thereby applying a low signal to the gate 87 via the "or" circuit 88. If desired, a like complementing circuit may be connected to the 10th column of the D-register 22 as indicated in Fig. 1.

Figure 6:
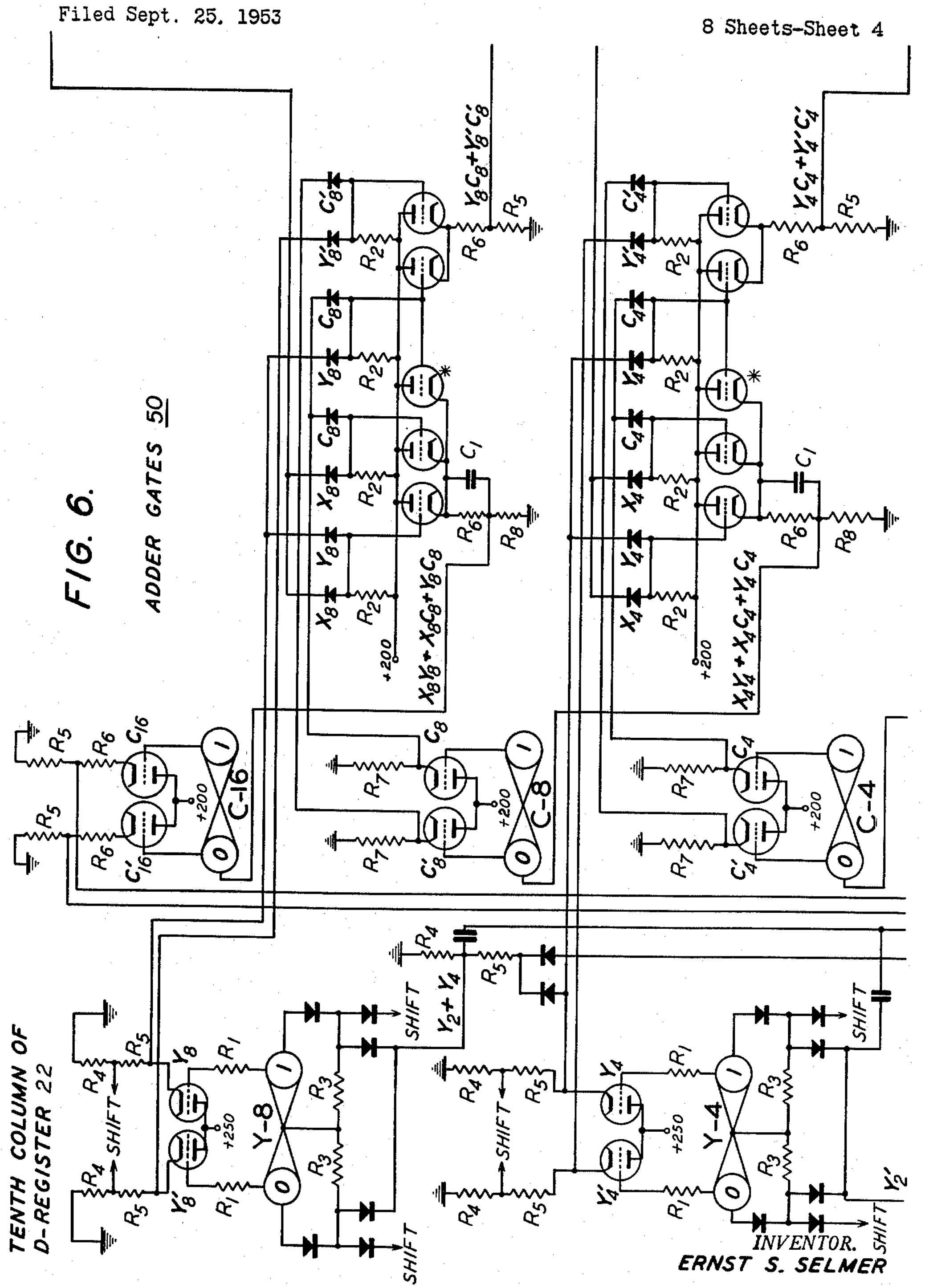
Figs. 6 to 9 show a schematic drawing of a preferred embodiment of the adder.
Figure 7:
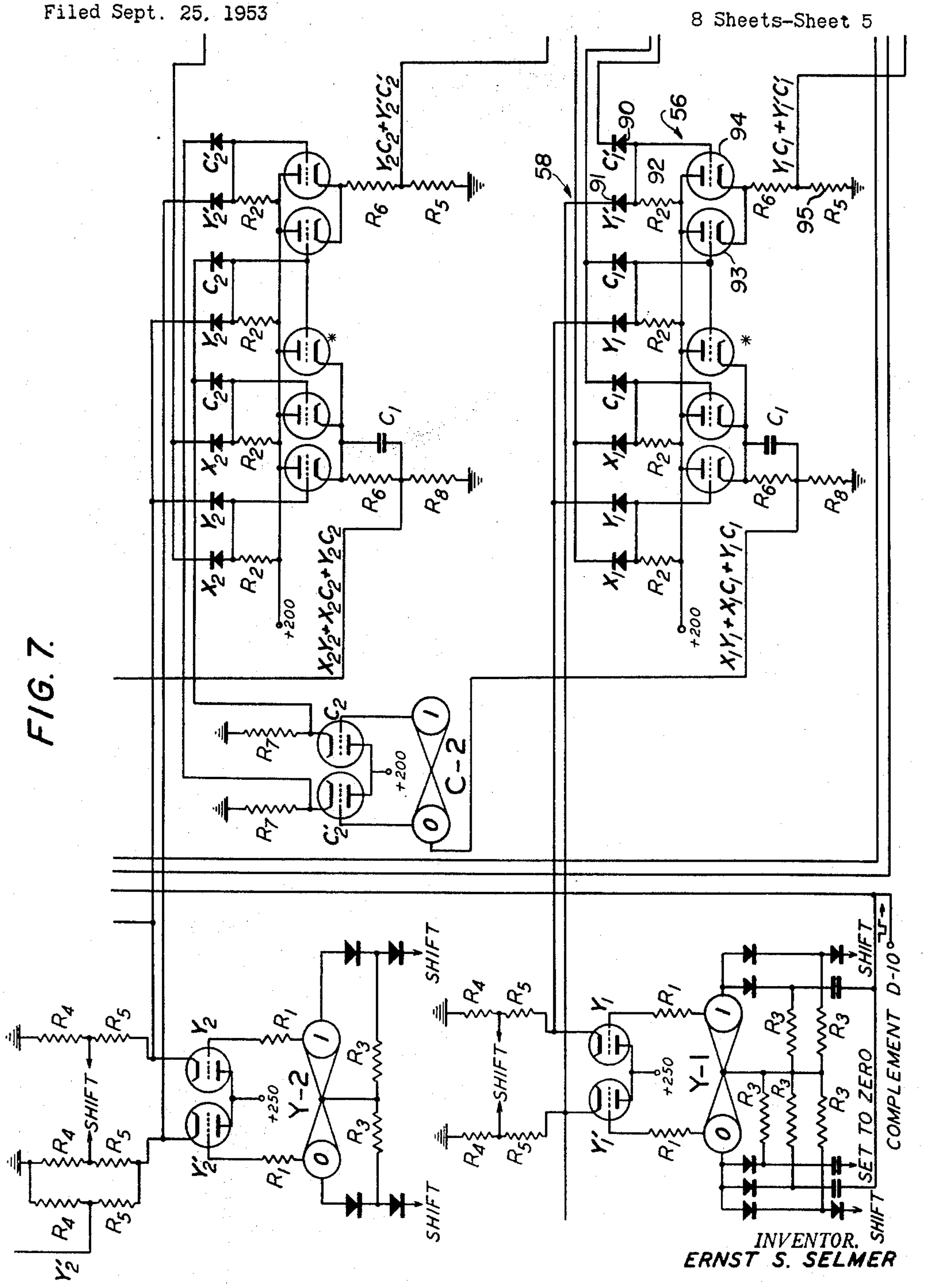

Figs. 6 to 9 show a schematic diagram of circuitry for effecting the operation described above with respect to Figs. 3 and 4. The same equations are employed in Figs. 6 through 9 as were used in Figs. 3 and 4, and the operation of the circuitry of Figs. 6 to 9 is the same as explained above with reference to Figs. 3 and 4. Fig. 6 and 7 include actual circuitry which may be used for the "and" circuits and "or" circuits of the adder gates 50. For example, with respect to the "and" circuit 58, the diodes 90 and 91, and the resistor 92 function to provide a high output signal when the Y–1 circuit is in its "0" condition of operation and the C–1 circuit is in its "0" condition of operation. The output signal from the "and" circuit 58 is then applied to the "or" circuit 56 which comprises a pair of triode electron tubes 93 and 94 which share a common cathode resistor 95. If either one of the electron tubes 93 and 94 is rendered conducting, the signal voltage appearing across the common cathode resistor will be high.

If desired, cathode followers may be connected to the outputs of each of the bi-stable digit registing circuits for the purpose of isolating the bi-stable circuits from the rest of the circuitry as shown.

Figure 8:
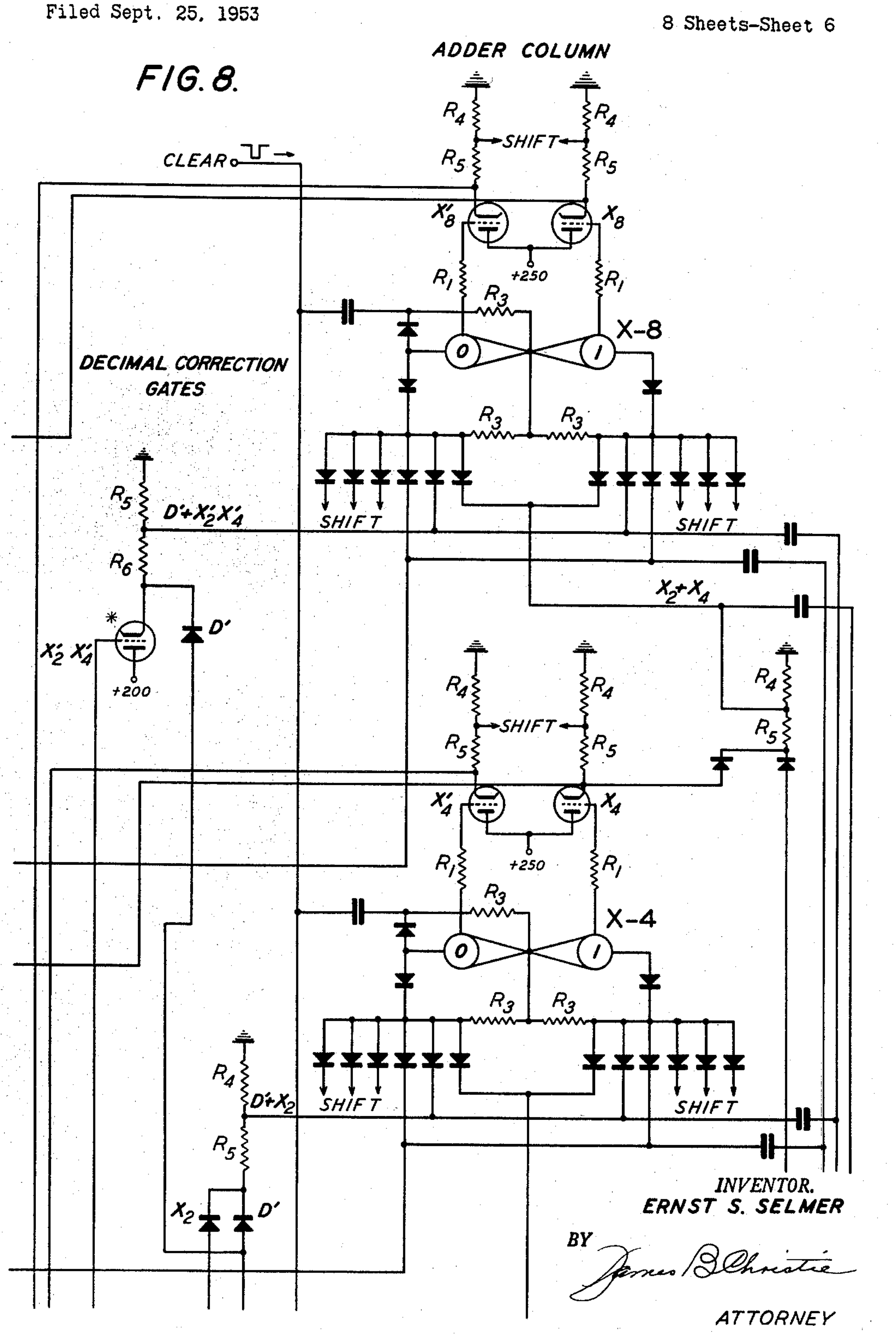
Figure 9:
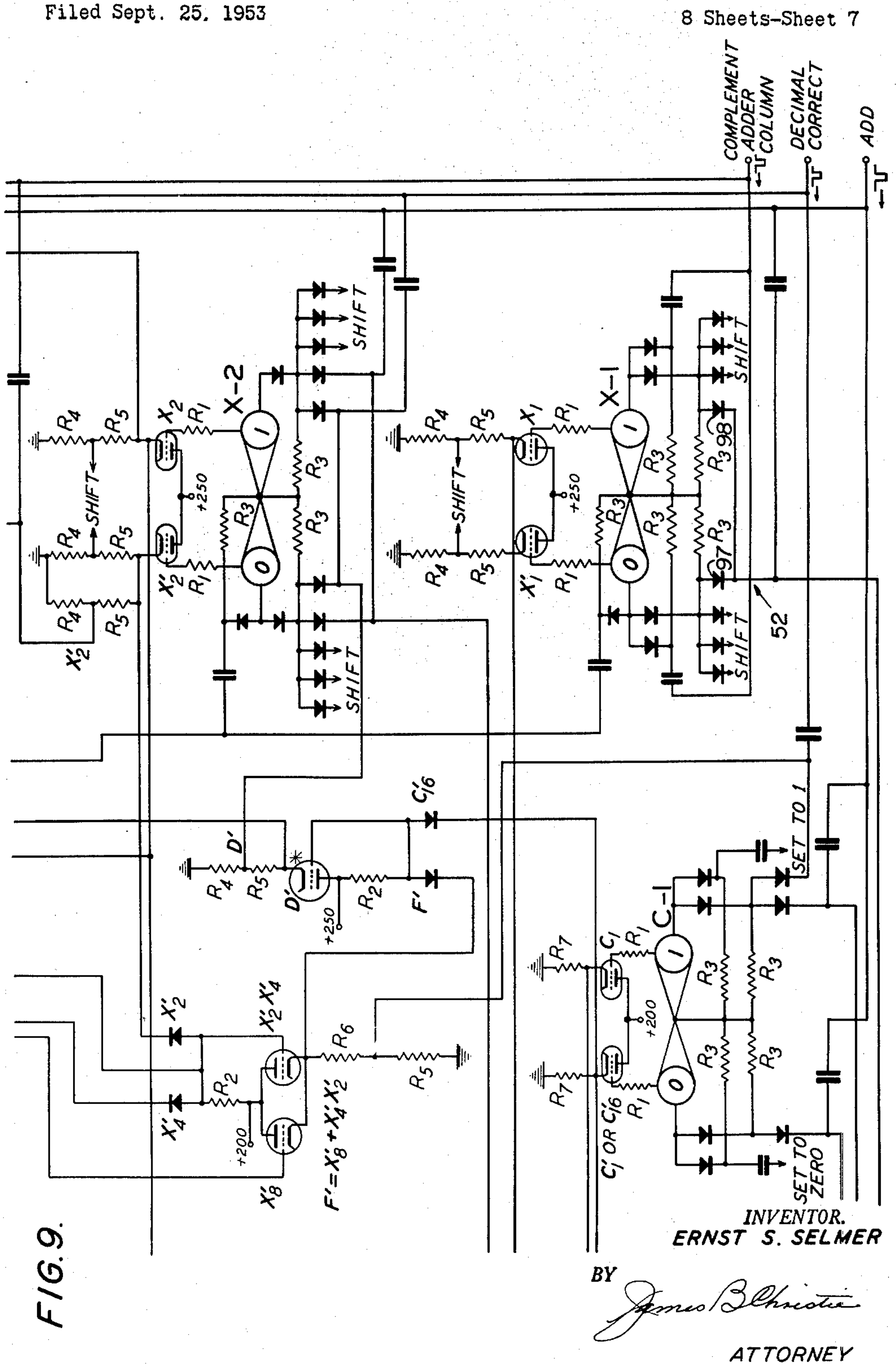

Figs. 8 and 9 show the bi-stable circuits X–8, X–4, X–2 and X–1 of the adder column. The gates for inhibiting the passage of certain of the pulses may comprise appropriately biased diodes. Thus, the gate 52 associated with the input to the X–1 circuit comprises the diodes 97 and 98, which are biased from the signal derived from the cathode resistor 95 of the two triode electron tubes 93 and 94 forming the "or" circuit 56 (Fig. 7). When a low signal is derived from the cathode resistor 95, the diodes 97 and 98 are biased in a direction which allows the adds pulse to be passed to the circuit X–1, while on the other hand, if the signal derived from the cathode resistor 95 is high, the diodes 97 and 98 will be maintained cut-off, so that the add pulse is inhibited from passing to the circuit X–1.

In addition, diodes are connected on each side of the bi-stable circuits of the 10th column of the register 22 and on each side of the bi-stable circuits of the adder column. Through these diodes there may be shifted into the bi-stable circuits the binary coded decimal digits to be added.

From the output circuits labeled "SHIFT" may be derived signals representing binary coded decimal digits corresponding to the resultant sum of an addition process. By connecting the input circuits and output circuits to conventional registers as indicated diagrammatically in Fig. 1, the apparatus may be employed to perform successive additions upon each binary coded decimal digit of a multiple digit number.

The following components are suitable for use in the apparatus of Figs. 6 to 9:

| | |
|---|---|
| Diodes | Reverse R>200,000 ohms. |
| Tubes | 12AU7 (* indicates only ½ tube used). |
| Capacitors | 100 pf., except C1=1000 pf. |
| R1 | 33,000 ohms. |
| R2 | 100,000 ohms. |
| R3 | 47,000 ohms. |
| R4 | 27,000 ohms. |
| R5 | 22,000 ohms. |
| R6 | 18,000 ohms. |
| R7 | 33,000 ohms. |
| R8 | 12,000 ohms. |

It will be appreciated that the specific circuitry illustrated in Figs. 6 through 9 is given by way of example only, and that the circuit values given above are merely indicative of those employed in one embodiment which has operated successfully. Other specific circuits, as well as different component values, may be employed to adapt the invention for a particular use.

Figure 10:
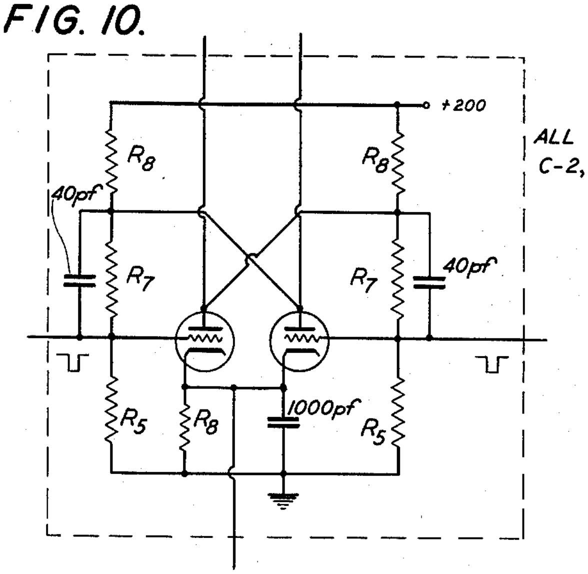
Figs. 10 and 11 show the two types of toggles employed in the apparatus of Figs. 6 to 9.
Figure 11:
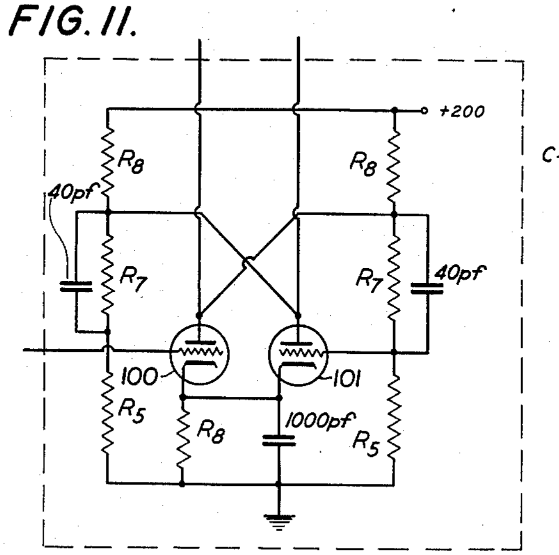
Figure 13:
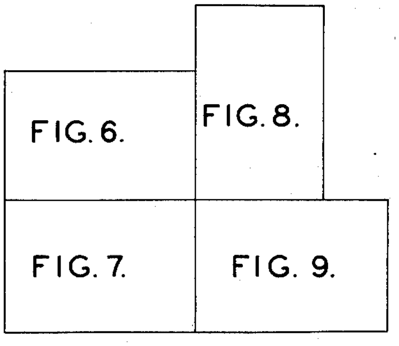
Fig. 13 shows how the drawings of Figs. 6 to 9 are combined.
Figure 12:
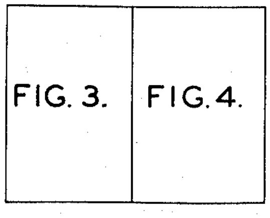
Fig. 12 shows how the drawings of Figs. 3 and 4 are combined.

Fig. 11 shows the circuit of one suitable bi-stable circuit which may be employed as the toggles C–2, C–4, C–8 and C–16 of Fig. 6 and 7, which, as noted above, is adapted to be changed from one condition of operation to another condition of operation in response to the value of a single input signal. Thus a signal applied to the control grid of the left-hand electron tube 100 of the circuit of Fig. 11 will cause the circuit to assume its "1" condition of operation in which the electron tube 101 is non-conducting when the value of the input signal is high, and will cause the circuit to assume its "0" condition of operation in which the electron tube 100 is non-conducting when the value of the input signal is low. The other toggles of Figs. 6 to 9 may be the type shown in Fig. 10. A negative signal may be applied to the control grid of the left-hand electron tube or to the control grid of the right-hand electron grid in order to cause the circuit to assume the "1" or the "0" condition of operation respectively. Accordingly, the anode potential of the left-hand tube is high when a "0" is indicated, and the anode potential of the right-hand tube is high when a "1" is indicated.

I claim:

1. An adder comprising three sets of four binary storage units for registering electrical signals corresponding to three variables X, Y and C, where X and Y represent digits of two addends and C represents a carry digit; pulse responsive adder gates interconnecting the Y signal storage units, the X signal storage units, and the C signal storage units for reversing the binary condition of the X signal storage units when the initial binary conditions of the corresponding Y and C signal storage units are different; carry gates for causing any one of the C signal storage units to register 1 if the initial binary conditions of at least two of three X signal, Y signal and C signal storage units associated with a particular one of the C signal units are equal to one, thereby providing a registration in the X signal and C signal storage units corresponding to the binary sum of the digits of said addends, and pulse responsive decimal correction gates for altering the condition of the X signal storage units to convert the binary registration to a binary coded decimal registration.

2. An electronic adder comprising a first set of toggles for registering a group of binary bits corresponding to one of successive digits of an addend, a second set of toggles for registering a group of binary bits corresponding to one of successive digits of another addend, carry toggles for registering signals corresponding to carry digits, gates interconnecting the first set of toggles and the carry toggles, and means including said gates for simultaneously altering the binary condition of the second set and one of the carry toggles in response to a single pulse to represent the binary sum of each of the successive digits represented by said signals.

3. An electronic adder comprising a first set of four toggles for registering binary bits corresponding to a decimal digit of an addend, a second set of four toggles for registering binary bits corresponding to a decimal digit of another addend, a carry toggle for registering a carry bit, and means including pulse responsive gates and a third group of four toggles interconnecting the first set of toggles, the second set of toggles and the carry toggles for simultaneously altering the binary condition of the second set of toggles and the carry toggle in response to a single add pulse to represent the sum of the digits which are registered by said signals.

4. The apparatus of claim 3, including means coupled to one of the sets of toggles for selectively altering the registration contained therein to correspond to the complement of the initial registration contained therein.

5. In an electronic adder, a set of four toggles and a carry toggle for providing a binary registration of signals corresponding to the sum of two decimal digits, and means including a gating circuit responsive to the binary condition of the four toggles and the carry toggle for selectively altering the binary condition of the toggles in response to a single decimal correct pulse to convert the binary registration therein to a binary coded decimal answer.

6. An electronic adder comprising a first set of four toggles for registering a group of binary bits corresponding to one of successive digits of an addend, a second set of four toggles for registering a group of binary bits corresponding to one of successive digits of another addend, a carry toggle for registering a carry bit from a previous addition, means including a group of adder gates and a third set of four toggles interconnecting the first set of toggles, the second set of toggles and the carry toggle for altering the binary condition of said second set of toggles in response to a single add pulse to represent the individual sums of the successive digits which are registered in the first set and second set of toggles and the carry toggle, and means including pulse responsive decimal correction gates responsive to the binary conditions of the second set of toggles and the carry toggle for selectively altering the binary condition of the second set of toggles and the carry toggle in response to a single decimal correct pulse to convert the binary registration therein to a binary coded decimal registration.

7. An electronic adder comprising a first set of four toggles for registering binary bits corresponding to a decimal digit of an addend, a second set of four toggles for registering binary bits corresponding to a decimal digit of another addend, a carry toggle for registering a binary bit corresponding to a carry from a previous addition, means including adder gates and a third set of four toggles interconnecting the first set of toggles, the second set of toggles, and the carry toggle for altering the binary condition of said second set of toggles in response to a single add pulse to represent the sum of the digital registrations in the first set and second set of toggles and the carry toggle, with decimal sums from 0 to 15 being registered in binary representation in the second set of toggles and the decimal sums from 16 to 19 being registered in binary representation in the second set of toggles together with the carry toggle, and means including pulse responsive decimal correction gates coupled to the second set of toggles and to the carry toggle for altering their binary condition in response to a single decimal correct pulse for decimal sums between 10 and 19 so that the tens digit is registered in the carry toggle and the units digit is registered in the second set of toggles.

8. The apparatus of claim 7, further including means coupled to the first and second sets of toggles for selectively altering the binary condition of the toggles to register the complement of the initial registration.

9. In combination, first and second shifting registers for providing binary coded registrations of two groups of decimal numerals to be added, means for shifting the binary coded registrations of each numeral in parallel along each of the registers, an adder having a set of four toggles coupled to the second register for storing the binary-coded registration of one numeral at a time in response to the successive registrations which are shifted along the second register, the adder including an additional toggle for registering signals corresponding to carry digits from previous additions of two decimal numerals, pulse responsive gates intercoupling the first register and said adder for altering the binary condition of the toggles to provide binary coded decimal registrations representing the individual sums of the successive registrations which are shifted along the two registers plus any carry digits, and means for successively transferring each decimal sum registration in the set of four toggles back to the second register.

10. The apparatus of claim 9, further including means coupled to the first register and to the set of four toggles in the adder for selectively complementing the registrations therein.

11. An electronic adder comprising a first register having a plurality of sets of four toggles for registering signals corresponding to an addend, a second register having a plurality of sets of four toggles for registering signals corresponding to another addend, means for simultaneously shifting the registrations from one set of toggles to the next set in each register, a set of five adder toggles, means for shifting the successive registrations of the digits of the addend in the second register into four of the adder toggles, and means including pulse responsive gates interconnecting a selected set of toggles of the first register and the five adder toggles for altering the binary condition of said four adder toggles and for registering any carry digits in the fifth adder toggle in response to an add pulse and decimal correct pulse to provide binary coded decimal registrations which represent the sums of the individual registrations of digits which are successively shifted into the adder toggles and the individual registrations of digits which appear in the selected set of toggles of the first register.

12. An adder comprising a first set of binary storage units for storing a group of binary bits indicative of a first digit, a second set of binary storage units for storing a group of binary bits indicative of a second digit, a third set of binary storage units for storing a group of binary bits indicative of a carry digit, the third set including one more storage unit than the first and second sets, first gating means including four identical gating circuits, each gating circuit being responsive to three associated binary units, one in each of the said three sets, and being arranged to set the next higher order binary storage unit in the third set to a binary one condition if the binary condition of two of the three associated binary units are in the binary one condition, second gating means responsive to a single add pulse including four identical gating circuits, each gating circuit being responsive to two associated binary units, one in each of said second and third sets, and arranged to reverse the corresponding binary storage unit in said first set when the binary condition of the two associated binary units are different, and third gating means responsive to a single decimal correct pulse, the third gating means being responsive to the condition of the three highest order bit units of said first set and to the condition of the lowest order bit unit of said third set for altering the condition of selected ones of the binary units in said first set and third set to convert the binary representation of the sum to a binary coded decimal representation.

13. An adder comprising a first set of binary storage units for storing a group of binary bits indicative of a first digit, a second set of binary storage units for storing a group of binary bits indicative of a second digit, a third set of binary storage units for storing a group of binary bits indicative of a carry digit, the third set including one more storage unit than the first and second sets, first gating means including four identical gating circuits, each gating circuit being responsive to three associated binary units, one in each of the said three sets, and being arranged to set the next higher order binary storage unit in the third set to a binary one condition if the binary condition of two of the three associated binary units are in the binary one condition, and second gating means including four identical gating circuits, each gating circuit being responsive to two associated binary units, one in each of said second and third sets, and arranged to reverse the corresponding binary storage unit in said first set when the binary condition of the two associated binary units are different.

References Cited in the file of this patent

UNITED STATES PATENTS

| | | |
|---|---|---|
| 2,364,540 | Luhn | Dec. 5, 1944 |
| 2,623,171 | Woods-Hill et al. | Dec. 23, 1952 |
| 2,634,052 | Bloch | Apr. 7, 1953 |
| 2,668,661 | Stibitz | Feb. 9, 1954 |
| 2,700,502 | Hamilton et al. | Jan. 25, 1955 |
| 2,705,108 | Stone | Mar. 29, 1955 |
| 2,719,670 | Jacobs et al. | Oct. 4, 1955 |

FOREIGN PATENTS

| | | |
|---|---|---|
| 678,427 | Great Britain | Sept. 3, 1952 |
| 1,035,312 | France | Apr. 15, 1953 |
| 1,035,453 | France | Apr. 15, 1953 |
| 1,043,321 | France | June 10, 1953 |

OTHER REFERENCES

Progress Report (2), on the EDVAC, Moore School of Electrical Engineering, Univ. of Penn., declassified Feb. 13, 1947. (Fig. PY–0–230, pages 1.4.9 through 1.4.14.)

ERA, "High Speed Computing Devices," McGraw-Hill Book Co., 1950, page 295 relied on.

"Synthesis of Electronic Computing and Control Circuits," by staff of the Computation Laboratory, Harvard Univ., Harvard Press, Cambridge, Mass., pp. 184 to 186, published May 17, 1951.